June 4, 1968      J. F. MITCHELL      3,386,236
CUCUMBER HARVESTING MACHINE
Filed July 20, 1965      3 Sheets-Sheet 1
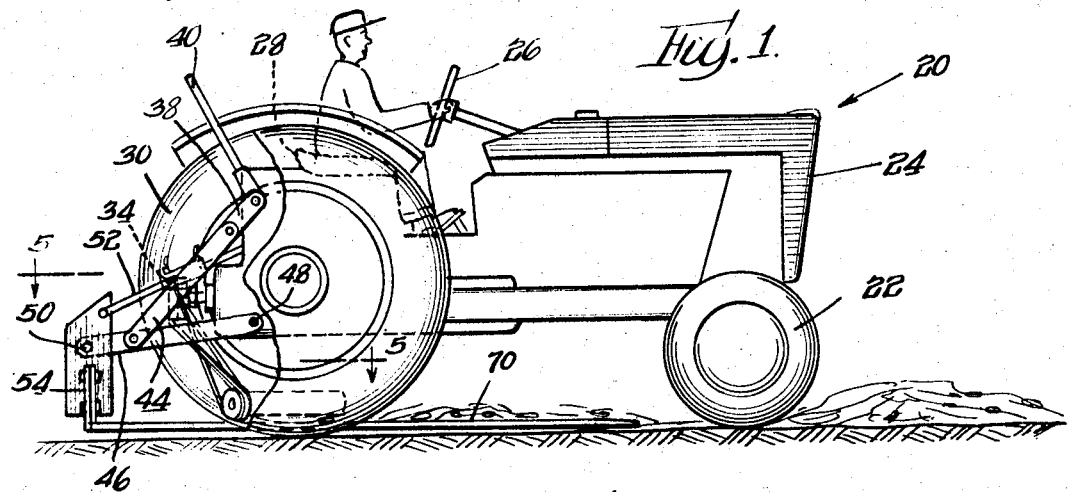
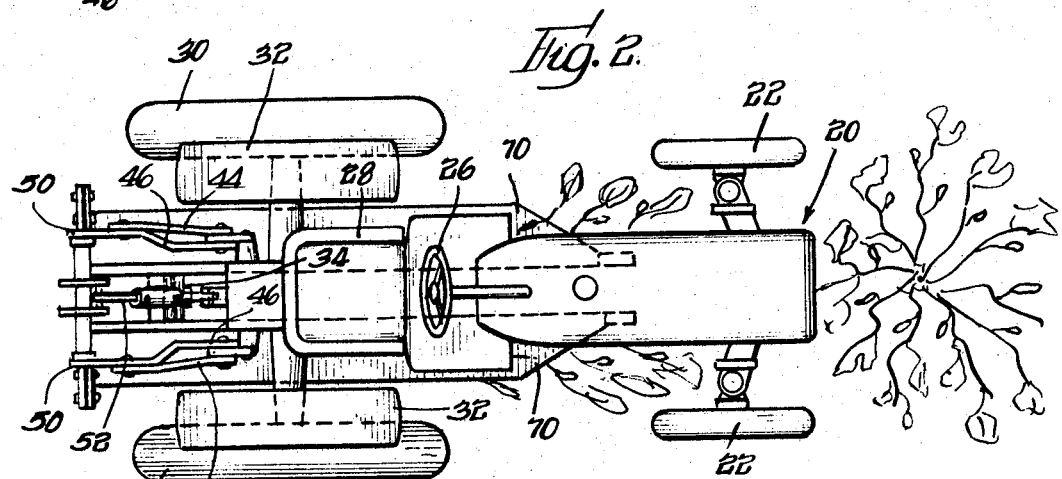
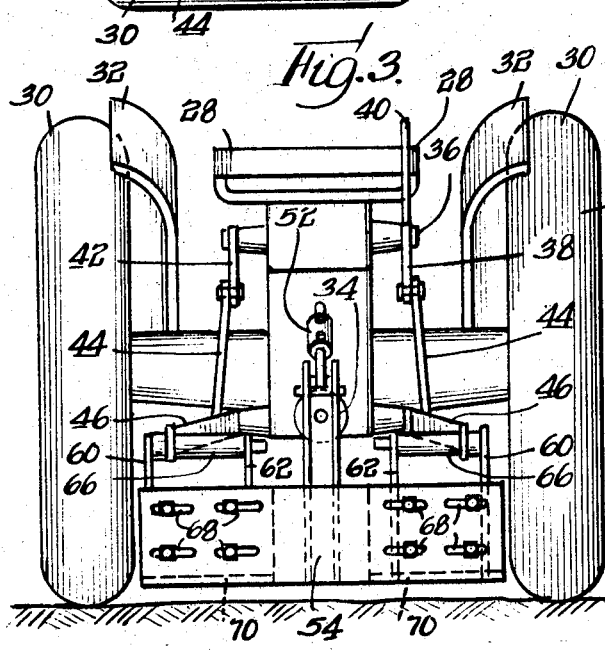
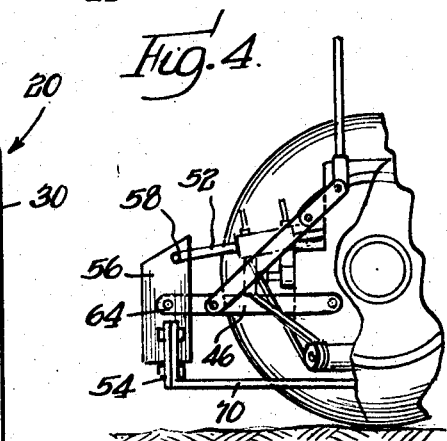
Inventor
John F. Mitchell
By: Olson, Trexler
Wolters & Bushnell attys June 4, 1968  J. F. MITCHELL  3,386,236
CUCUMBER HARVESTING MACHINE
Filed July 20, 1965  3 Sheets-Sheet 2
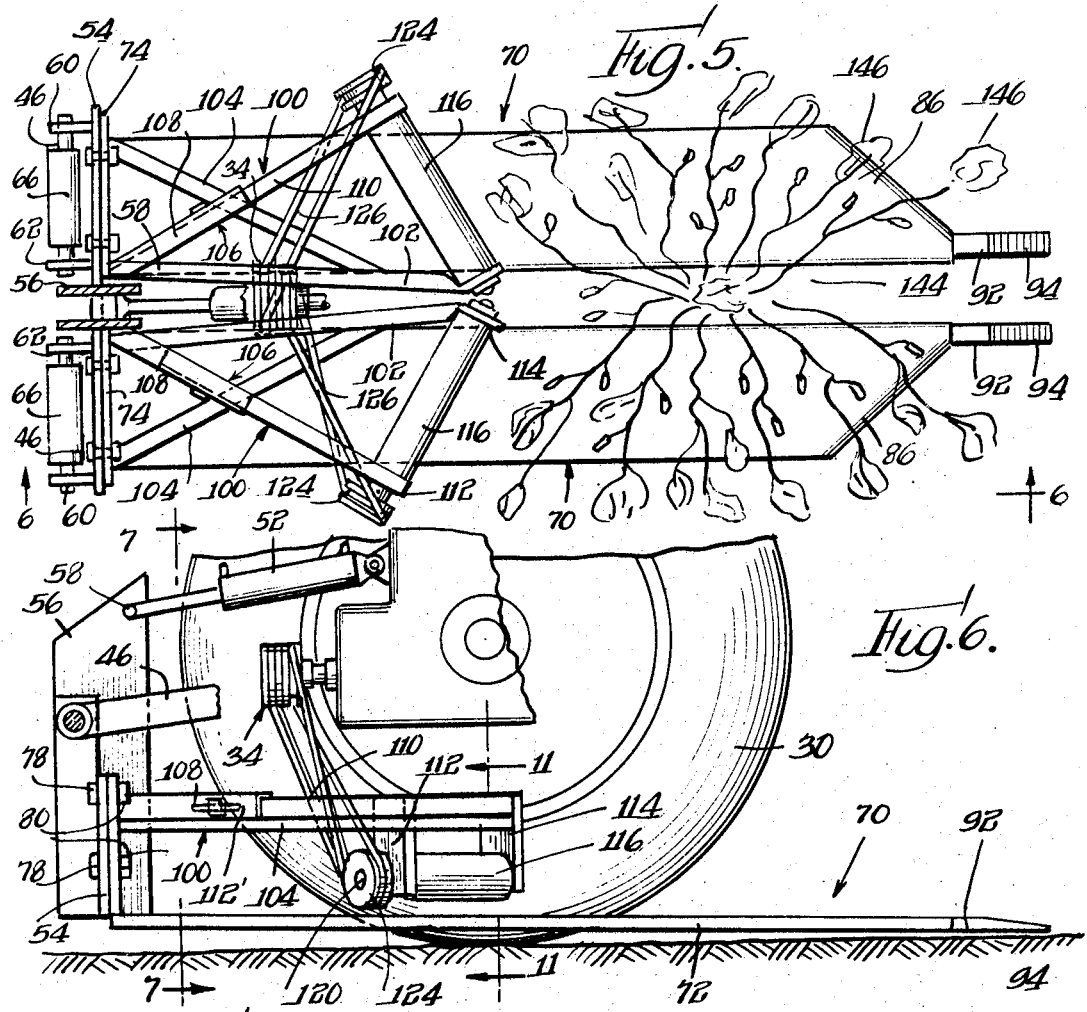
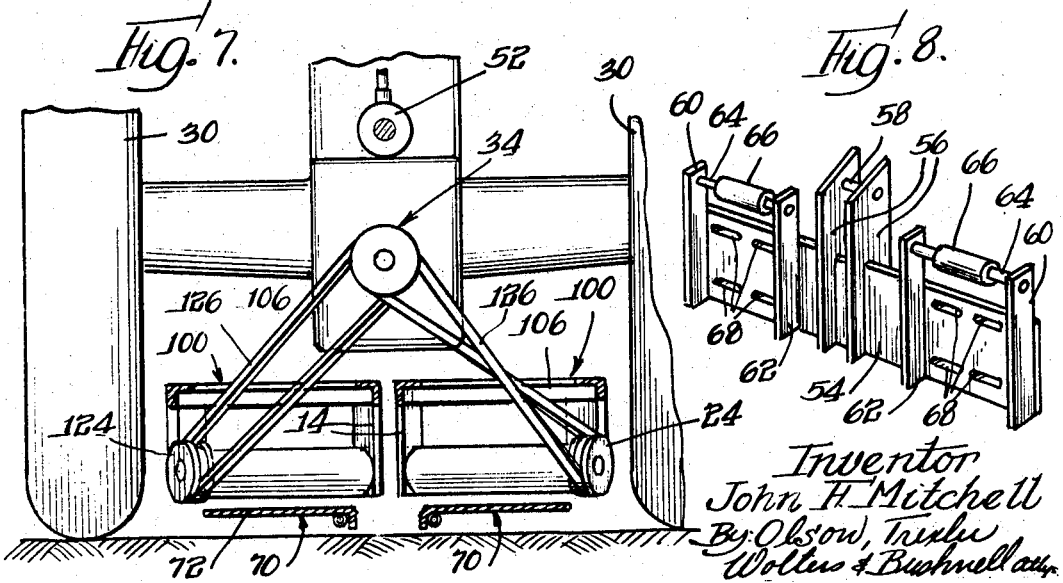
Inventor
John F. Mitchell
By Olson, Trexler
Wolters & Bushnell, attys.

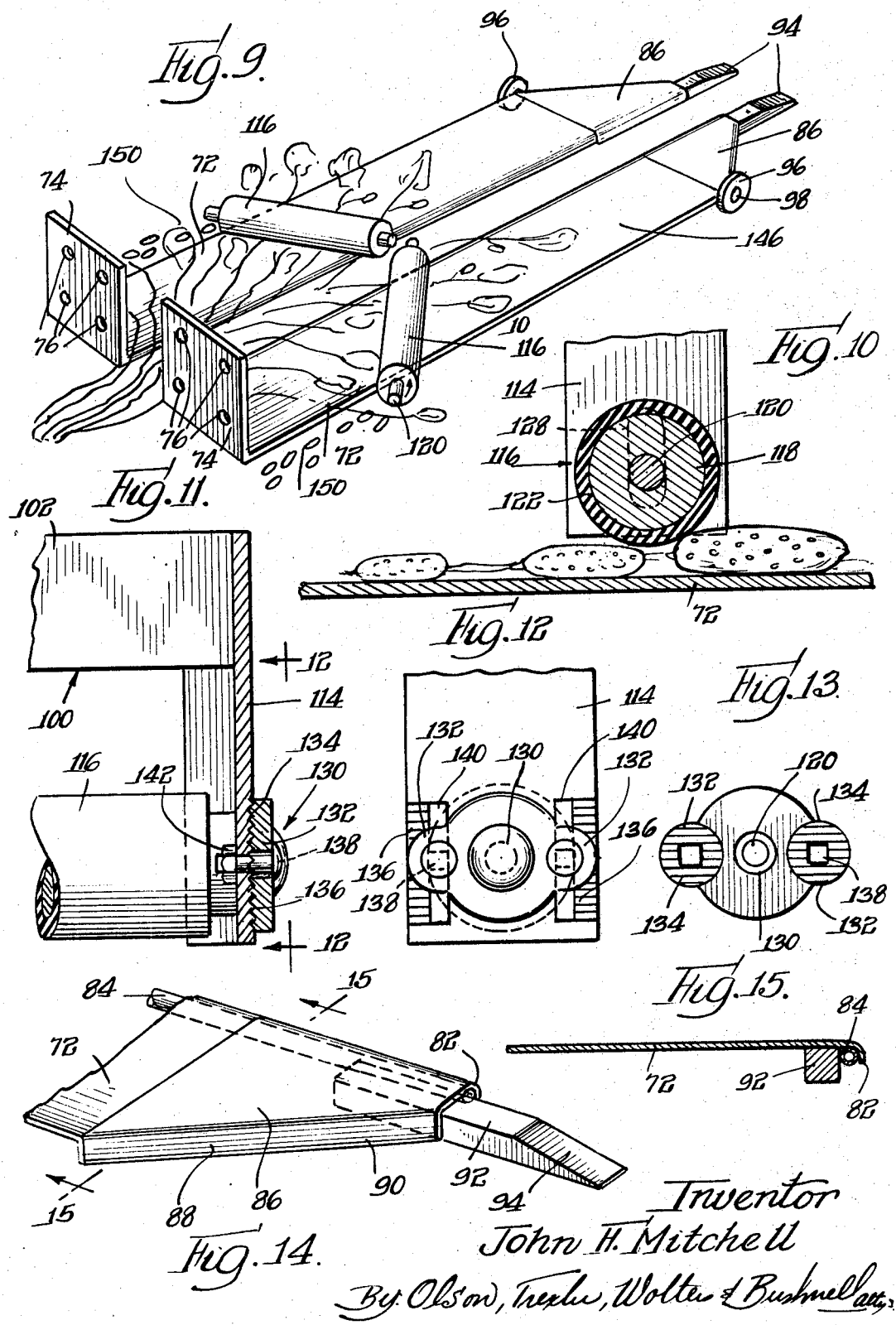

United States Patent Office 3,386,236
Patented June 4, 1968

3,386,236
CUCUMBER HARVESTING MACHINE
John F. Mitchell, Wiesner Road, Mitchell Farms,
Breckenridge, Mich. 48615
Filed July 20, 1965, Ser. No. 473,399
10 Claims. (Cl. 56—327)

This invention relates to the art of agricultural implements, and more particularly to a cucumber harvesting machine, sometimes known as a pickle-picker.

Cucumbers grow on vines, generally in level fields. Unfortunately, from a standpoint of harvesting, the cucumbers mature over a period of several weeks. It is common practice to pick cucumbers in accordance with the size thereof, according to whether they are destined for table use, for pickling, etc. Heretofore, it has been necessary to pick cucumbers by hand, in order that the proper size, i.e., 1" diameter, 2" diameter, etc., can be picked with the remaining cucumbers left to grow until they have reached the desired size.

Various mechanical harvesting devices for other crops are known. For example, root crops such as peanuts are pulled up at the same time. Beans and other types of vine crops have heretofore been pulled up vine and all for handling, since the exact size is not particularly critical. However, heretofore, pickles or cucumbers have resisted mechanical harvesting.

Accordingly, it is an important object of the present invention to provide a machine for harvesting cucumbers.

In particular, it is an object of this invention to provide an attachment for a conventional farm tractor for harvesting cucumbers.

It is another object of the present invention to provide a cucumber harvesting machine wherein cucumbers of a predetermined size are harvested and those of smaller size are left to grow until they reach the desired size.

Yet another object of this invention is to provide a cucumber harvesting machine which is readily adjustable for harvesting cucumbers of different sizes.

A still further object of the present invention is to provide a cucumber harvesting device having terrain sensing and following means for use in harvesting cucumbers in fields that are bumpy or non-level.

Other and further objects and advantages of the present invention will be apparent from the following description when taken in connection with the accompanying drawings wherein FIG. 1 is a side-view of a conventional farm or agricultural tractor equipped with the cucumber harvesting apparatus of the present invention;

FIG. 2 is a plan view thereof;

FIG. 3 is an enlarged rear view thereof;

FIG. 4 is a detail view showing certain of the mounting and operating parts of the harvesting apparatus;

FIG. 5 is an enlarged top plan view taken substantially along the line 5—5 in FIG. 1, and partly in section;

FIG. 6 is a fragmentary vertical view partly in section as taken substantially along the line 6—6 in FIG. 5;

FIG. 7 is a rear view partly in section as taken substantially along the line 7—7 in FIG. 5;

FIG. 8 is a top perspective view showing a part of the mounting mechanism of the harvesting apparatus;

FIG. 9 is a top rear perspective view of a part of the harvesting apparatus cooperable with the mechanism of FIG. 8 and showing the manner in which the cucumbers are harvested;

FIG. 10 is a vertical section view on a greatly enlarged scale showing how the cucumbers are picked according to size;

FIG. 11 is a substantially vertical detail view in section as taken along the line 11—11 in FIG. 6;

FIG. 12 is a corresponding view taken substantially along the line 12—12 in FIG. 11;

FIG. 13 is a backside view of part of the mechanism of FIG. 12;

FIG. 14 is an enlarged, detail perspective view of a front portion of the harvesting apparatus; and FIG. 15 is a vertical sectional view as taken substantially along the line 15—15 in FIG. 14.

Referring now in greater particularity to the drawings, and first to FIGS. 1–3, the cucumber harvesting apparatus is shown as affixed to a conventional farm or agricultural tractor 20. This tractor is of the type having spaced-apart front wheels 22 at the front rear portion of an engine compartment 24. The front wheels 22 are steerable by suitable mechanism including a steering wheel 26 which conveniently may be operated from a driver's seat 28. The tractor has the usual large rear driving wheels 30, preferably with fenders 32 thereon.

In accordance with conventional practice, the tractor also is provided with a rotary power take-off 34 driven from engine through suitable transmision, shaft and clutch means, not shown. Also in accordance with conventional practice, the tractor is provided just below the seat and to the rear thereof with a cross-shaft 36. The cross-shaft has fixed to it a bell crank 38 with an upwardly extending handle 40 immediately to the rear of the operator's seat and readily grasped manually by the operator. The shaft at the opposite end has an arm 42 fixed thereon parallel to the lower arm of the bell crank 38. The two arms 38 and 42 have diagonal links 44 pivoted thereto. At their lower ends the links are pivoted to lifting arms or levers 46 which are pivoted at their forward ends 48 to suitable bosses on the tractor. The rear ends at 50 are attached to the harvesting mechanism as will be set forth hereinafter. Further forming a part of the conventional mechanism of the tractor, there is a pivotally mounted lifting arm 52 pivotally secured to the rear of the tractor below the cross-shaft 36. The arm 52 is shown as being a hydraulically extensible arm, but in tractors which are not equipped with a hydraulic system this arm can be manually varied in length, as by a screw arrangement.

A mounting or base plate 54 for the harvesting apparatus may be seen best in FIG. 8, although it also is to be seen in FIGS. 1 and 3–6. The base plate 54 is mounted in a generally vertical position transverse of the longitudinal axis of the tractor, and is provided with a pair of spaced upstanding plates forming a bracket 56 extending vertically above the base plate 54. The bracket base 56 is split at the bottom ends to receive the base plate 54 and is welded thereto. At the top end the bracket 56 is provided with a transverse shaft or axle 58 which is pivotally connected by known or suitable means to the supporting or extensible arm 52.

Adjacent the outer ends the mounting plate 54 is provided on its backside with upstanding support plates 60. Inwardly therefrom in spaced relation thereto are parallel inner support plates 62, all of the support plates being suitably welded to the base plate 54. Transverse support shafts 64 extend between each pair of plates 60, 62. The rear ends of the support arms 46 are pivotally received on the shafts 64, and cylindrical spacers 66 are provided for properly determining the lateral position of the arms 46 on the shafts 64.

It will be apparent that when the handle 40 is in the position shown in FIG. 1, the lower arm of the bell crank 38 and the link or lifting arm 44 form a straight line continuation of one another, and the base plate 54 is in the lowered position shown. When the handle 40 is pulled up toward the operator manually, the links or arms 44 pull up on the arms 46, thereby to lift the base plate 54. The relative lengths of the ams 46 and the arm 52, and the pivot centers thereof cause the base plate to rise with a more-or-less vertical disposition at all times, and any undesirable change from the vertical can be compensated for by changing the length of the arm 52, either hydraulically with a hydraulically equipped tractor, or manually in a tractor that is not so equipped.

The outer ends of the base plate 54 between the plates 60 and 62 are provided with pairs of upper and lower horizontally elongated slots 68. The harvesting apparatus further comprises a pair of traversing assemblies 70 seen in particular in FIGS. 5–7 and 9, but also visible generally in FIGS. 1–4. Each traversing assembly comprises a substantially horizontal bed 72 in the form of a longitudinally elongated plate carried substantially parallel to the ground. At the rear end of each bed 72 there is an upstanding flange 74 rigid therewith, and this flange may be integral with the bed in each case or welded thereto. Each flange 74 is provided with four spaced apertures 76. Bolts 78 pass through the slots 68 and also through the slots 70, and have nuts 80 threaded on the front ends thereof to secure the traversing assemblies 70 to the front of the base plate 54 in laterally spaced relation. The bolt-in-slot mounting provides for horizontal adjustment of the spacing between the traversing assemblies in accordance with individual requirements.

The inner or confronting edges of the beds 72 are rolled over as at 82, and a pipe 84 is welded in place beneath and against the rolled-over edge longitudinally to reinforce each bed. The pipe 84 also serves to reinforce a triangular front end or lead-in portion 86 secured to or formed integral with each bed 72. Each such front end 86 has a diagonal leading edge 88 rolled over at 90 and leading to the outer longitudinal edge of the corresponding bed 72. A nose piece 92 is suitably welded in place beneath the triangular entering end portion 86 and abuts on one side the pipe 84. The rolled over edge 90 fits tightly over the nose piece 92. The nose piece comprises a substantially rectangular bar having a wedge shaped tip 94. In normal operation the beds 72 are held by the base plate 54 in nearly horizontal position, the front end being an inch or so below the back end, and the wedge shaped tip 94 of the nose piece 92 lightly scraping the ground.

Under some conditions of operation with bumpy or undulating ground, it is desirable to provide wheels 96 (see FIG. 9 only) which may be considered an optional accessory necessary under some conditions of operation. The wheels are rotatable on axles 98 mounted at the forward ends of the beds 72 adjacent the tapering end portions 86, and they are of such diameter as to hold the front ends of the beds a slight distance above the ground so as to avoid digging in of the nose pieces 92 when encountering bumps.

A supporting frame 100 (FIGS. 5–7) extends forwardly from the flanges 74 on each side, respectively substantially parallel to the beds 72. Each frame includes an inner, substantially longitudinal member 102 extending nearly in the longitudinal direction of the traversing assembly 70, but with the two longitudinal members 102 angling in toward one another as best seen in FIG. 5. Diagonal braces 104 extend from the flanges to the outer portions of the longitudinal members 102, the parts all being suitably welded together. In addition, there are outwardly diverging longitudinal support arms 106 comprising overlapping portions 108 and 110 secured together with a sliding fit by means such as a bolt-in-slot connection 112′ (FIG. 6). The outer end of the adjustable diagonal arm 106 is provided with a depending flange 112, while each longitudinal arm 102 is similarly provided with a depending flange 114, angulated relative to the arm 102 and parallel to the flange 112. Rollers 116 are respectively supported from the pairs of depending flanges 112–114 by spherical bearings, as will hereinafter be discussed. The rollers 116 are formed of hard center cores 118 (FIG. 10) having axles 120 extending from the ends thereof. The rollers have relatively dense, but resilient rubber outer portions 122, and the rollers may be thought of as being constructed along the lines of the old fashioned ringer washing machine rollers. The bottom portion of the rollers 116 are parallel to the top surfaces of the beds 72, while the inner ends of the rollers as supported by the flange 114 lead the outer ends thereof as supported by the flange 112, the rollers being diagonally disposed as best seen in FIGS. 5 and 9. Each roller 116 is provided on its outer end beyond the adjacent flange 112 with a pulley 124 fixed on the respective axle 120. The power take-off 34 of the tractor comprises a double pulley, and flexible drive belts 126 are passed over the pulleys 124 and the double pulley 134 to drive the rollers 116. One of the belts 126 (the right one in the embodiment illustrated) is twisted while the other belt is not, in order that both rollers might be driven in the same direction with the undersides thereof moving forward relative to the direction of travel of the tractor and of the traversing assembly 70. Means, not shown, and considered to be old are used to keep the drive belts on the pulleys.

As will be seen best in FIGS. 10–13, each axle 120 extends through the respective flange 112, 116 through a vertically elongated slot 128 and is received in a spherical bearing 130. The bearing has a retainer or bearing cap with horizontally extending ears 132. Each ear is formed on its back side or surface with horizontal serrations 134, and the adjacent portions of the flanges 112, 114 are likewise formed with complementary horizontal serrations 136. Bolts 138 extend through complementary apertures in the ears 132, and also through vertical slots 140 in the flanges 112, 114. Conveniently, the bolts may be carriage bolts with non-circular sections under the head whereby to preclude rotation of the bolts in the ears 132. Nuts 142 are threaded on the bolts on the inner surfaces of the flanges 112, 114 to lock the serrations 134, 136 in engagement with one another, and thereby to hold the rollers 116 at a pre-selected height.

The cucumbers are nominally planted in hills, but after a few weeks and some rain, the hills flatten out and become non-existent. In any event, the vines 144 (see FIGS. 5 and 9 in particular) grow outward at random from the hills, and are trained as by manual cultivation, to grow out predominantly at right angles to the rows of hills in which the cucumbers are planted. Thus, when the tractor 20 is driven over a row of hills, the roots and lower ends of the vines pass between the noses 92 and the beds 72, with the noses 92, and particularly the wedge shaped tips 94 thereof catching beneath the vines and lifting them very slightly to ride along the top of the beds 72. The vines readily slide beneath the rotating rollers 116, but the cucumber 146 growing on the vines are engaged by the rollers if the cucumbers are of large enough size. As will be understood, the rollers are adjustable up and down in the manner just described in order to determine what size the cucumbers will be picked i.e., 1″ diameter, 1½″ diameter, etc. The cucumbers which are large enough to be picked are torn from the vines by the rotating rollers 116 and are dropped off the right and left sides respectively of the beds 72 in fairly neat rows 150. The smaller cucumbers remain on the vines. The rows of cucumbers 150 are readily picked up manually at far greater speed that the cucumbers could be picked from the vines manually, and they are picked with far greater regard for uniformity of size in accordance with the present invention. Conveyor mechanisms such as those of the endless belt type are well-known and it is contemplated that a conveyor mechanism could be incorporated with the present invention and mounted on the tractor so that the cucumbers when picked would land on the conveyor mechanism and then would be transferred to a suitable receptacle carried by the tractor. Since such conveyor systems are known they are not shown herein.

It is also contemplated that means could be provided in connection with the harvesting apparatus causing the vines to move apart after the cucumbers have been harvested. However, such mechanism is not essential to operation or the harvesting apparatus as herein described, and hence is not shown herein. It will be understood that the cucumbers will be picked eight or ten times over a period of a few weeks. Finally, the vines will be pulled up completely by other apparatus to salvage whatever size of cucumbers may be left.

The rolled over inner edges of the beds 72 and the rolled over front diagonal edges 90 of the triangular front pieces 86 prevent damage to the vines. The outward thrust of the rollers, due to the diagonal disposition, tends to balance forces pulling on the vines, and hence prevents disruption of the root system of the vines. The angular disposition of the rollers 116 is adjustable by the bolt-in-slot arrangement 112 in the arms 106 in accordance with different conditions. The spherical bearings automatically compensate for the changes in angle of the bearings relative to the supporting structure. Since the belts extend diagonally downward, the pulleys 124 move with a sort of a swinging motion and the angular adjustment can be made within some limits without the necessity of changing belts.

The specific example of the invention as herein shown and described is for illustrative purposes only. Various changes in structure can be made without departing from the spirit and scope of the invention, and all such changes are included in the present invention insofar as they fall within the spirit and scope of the appended claims.

The invention is claimed as follows:

1. Cucumber harvesting apparatus comprising elongated support means having a top surface and a front end and a rear end, means for passing said support means longitudinally along the ground and beneath cucumber vines from said front end to said rear end, roller means mounted on but spaced above said support means a predetermined distance according to the diameter of cucumbers to be harvested with the axis of said roller means substantially parallel to the top surface of said support means, and means for rotating said roller means with the portion thereof confronting said support means top surface relatively moving from said rear end to said front end.

2. Cucumber harvesting apparatus comprising elongated support means having a top surface and a front end and a rear end, means for supporting said support means with the rear end thereof at least as high above the ground as the front end, means for passing said support means longitudinally along the ground and beneath cucumber vines from said front end to said rear end, roller means mounted on but spaced above said support means a predetermined distance according to the diameter of cucumbers to be harvested with the axis of said roller means substantially parallel to the top surface of said support means, and means for rotating said roller means with the portion thereof confronting said support means top surface relatively moving from said rear end to said front end.

3. Cucumber harvesting apparatus as set forth in claim 2 wherein said front end engages the ground and the rear end is supported above the grounnd, the rear end thus being higher than the front end.

4. Cucumber harvesting apparatus as set forth in claim 2 and further including wheel means rotatably supported adjacent the front end of said support means and maintaining said front end at a predetermined level relative to the ground regardless of the terrain.

5. Cucumber harvesting apparatus comprising elongated support means having a top surface and a front end and a rear end, means for passing said support means longitudinally along the ground and beneath cucumber vines from said front end to said rear end, roller means, means spacing said roller means above said support means a predetermined distance according to the diameter of cucumbers to be harvested with the axis of said roller means substantially parallel to the top surface of said support means and skewed relative to the longitudinal dimension of the support means, means for rotating said roller means with the portion thereof confronting said support means top surface relatively moving from said rear end to said front end.

6. Cucumber harvesting apparatus comprising a slideplate having a top surface and a front end and a rear end, means for passing said slideplate longitudinally along the ground and beneath cucumber vines from said front end to said rear end, roller means mounted on but spaced above slideplate a predetermined distance according to the diameter of cucumbers to be harvested with the axis of said roller means substantially parallel to the top surface of said sideplate, and means for rotating said roller means with the portion thereof confronting said sideplate top surface relatively moving from said rear end to said front end.

7. Cucumber harvesting apparatus comprising a pair of spaced apart elongated support means each having a top surface and a front end and a rear end, means for maintaining said support means in substantially parallel spaced apart relation, means for passing said pair of support means longitudinally along the ground and beneath cucumber vines from the front ends to the rear ends, a pair of roller means mounted on but respectively spaced above said support means predetermined distances according to the diameters of cucumbers to be harvested with the axes of said roller means substantially parallel respectively to the top surfaces of said support means, and means for rotating said roller means with the portions thereof confronting said support means top surfaces relatively moving from said rear ends to said front ends.

8. Cucumber harvesting apparatus as set forth in claim 7 and further including means for adjusting the spacing between said pair of elongated support means.

9. Cucumber harvesting apparatus as set forth in claim 7 wherein said rollers have inner ends respectively confronting one another and also having spaced apart outer ends, the axes of said rollers being skewed with the inner ends of the rollers leading the outer ends in the direction of travel from said front end to said rear end whereby said rollers pull in opposite directions on cucumbers and thereby to exert a substantially balanced pull on the vines to avoid disturbing a root system.

10. Cucumber harvesting apparatus comprising support means having a top surface and a front end and a rear end, means for carrying said support means with the rear end at least as high as said front end, means for passing said support means longitudinally along the ground and beneath cucumber vines from said front end to said rear end, cucumber pulling means mounted on but spaced above said support means a predetermined distance according to the diameter of cucumbers to be harvested, and means for moving said cucumber pulling means relative to said support means from said rear end to said front end to engage cucumbers of a predetermined size on said support means and thereby to pull said cucumbers of predetermined size from the vines on which they grow.

References Cited
UNITED STATES PATENTS

| | | | |
|---|---|---|---|
| 2,829,484 | 4/1958 | Gilbert | 56—327 |
| 2,841,947 | 7/1958 | Grew | 56—327 |
| 3,347,031 | 10/1967 | De Long et al. | 56—327 |

ANTONIO F. GUIDA, *Primary Examiner.*

R. R. KINSEY, *Assistant Examiner.*